US010202893B2

(12) United States Patent
Liu et al.

(10) Patent No.: US 10,202,893 B2
(45) Date of Patent: Feb. 12, 2019

(54) DOUBLE CHANNEL POWER TURBINE SYSTEM AND CONTROL METHOD THEREOF

(71) Applicant: Dongfeng Commercial Vehicle Company Limited, Wuhan, Hubei Province (CN)

(72) Inventors: Zhengbai Liu, Wuhan (CN); Xianmin Liao, Wuhan (CN)

(73) Assignee: DONGFENG COMMERCIAL VEHICLE COMPANY LIMITED, Wuhan, Hubei Province (CN)

( * ) Notice: Subject to any disclaimer, the term of this patent is extended or adjusted under 35 U.S.C. 154(b) by 142 days.

(21) Appl. No.: 15/203,766

(22) Filed: Jul. 6, 2016

(65) Prior Publication Data

US 2017/0191407 A1 Jul. 6, 2017

(30) Foreign Application Priority Data

Dec. 30, 2015 (CN) .......................... 2015 1 1007242

(51) Int. Cl.
*F02B 33/44* (2006.01)
*F02G 3/00* (2006.01)
*F02D 23/00* (2006.01)
*F02B 37/00* (2006.01)
*F02B 37/18* (2006.01)

(52) U.S. Cl.
CPC .......... *F02B 37/005* (2013.01); *F02B 37/183* (2013.01); *Y02T 10/144* (2013.01); *Y02T 10/16* (2013.01)

(58) Field of Classification Search
CPC ...... F02B 37/005; F02B 37/004; F02B 37/18; F02B 37/183; F02B 37/186; Y02T 10/144; Y02T 10/16
USPC .................. 60/602, 607–609, 612, 614, 624; 123/559.1, 562
See application file for complete search history.

(56) References Cited

U.S. PATENT DOCUMENTS 4,391,098 A * 7/1983 Kosuge ................. F02B 37/005
60/602
4,674,284 A * 6/1987 Kronogard ............ F02B 37/005
60/624

(Continued)

FOREIGN PATENT DOCUMENTS

| CH | 674549 A5 * | 6/1990 | ............ F02B 37/005 |
| CN | 204200320 U * | 3/2015 | |
| DE | 3807372 A1 * | 9/1989 | ............ F02B 37/013 |

*Primary Examiner* — Thai Ba Trieu
(74) *Attorney, Agent, or Firm* — Houtteman Law LLC

(57) ABSTRACT

A double channel power turbine system includes an internal combustion engine body, a turbocharger and a mechanical driving device. The double channel power turbine includes a first power turbine channel with an inlet which is in connection with the internal combustion engine body after passing through an exhaust manifold, and a second power turbine channel with an inlet which is in connection with the internal combustion engine body after passing through the turbocharger turbine and the exhaust manifold; an outlet of each of the first power turbine channel and the second power turbine channel is in connection with an exhaust aftertreatment system; the exhaust gas discharged into the first power turbine channel and the exhaust gas in the second power turbine channel operate the double channel power turbine.

4 Claims, 1 Drawing Sheet

(56) References Cited

U.S. PATENT DOCUMENTS

| | | | | |
|---|---|---|---|---|
| 4,858,440 | A * | 8/1989 | Okada | F02B 41/10 60/624 |
| 5,138,840 | A * | 8/1992 | Oguchi | F02B 37/005 60/624 |
| 6,286,312 | B1 * | 9/2001 | Bertilsson | F02B 37/005 60/624 |
| 7,010,918 | B2 * | 3/2006 | Ruess | F02B 37/005 60/624 |
| 7,347,048 | B2 * | 3/2008 | Albat | F02B 37/005 60/624 |
| 7,426,831 | B2 * | 9/2008 | Grissom | F02B 37/013 60/612 |
| 8,495,877 | B2 * | 7/2013 | Weyer | F02B 37/004 60/624 |
| 8,904,788 | B2 * | 12/2014 | Sarby | F02B 37/004 123/562 |
| 2012/0191321 | A1 * | 7/2012 | Ibuki | F02B 37/004 701/102 |
| 2013/0186086 | A1 * | 7/2013 | Sarby | F01N 3/2066 60/602 |

\* cited by examiner

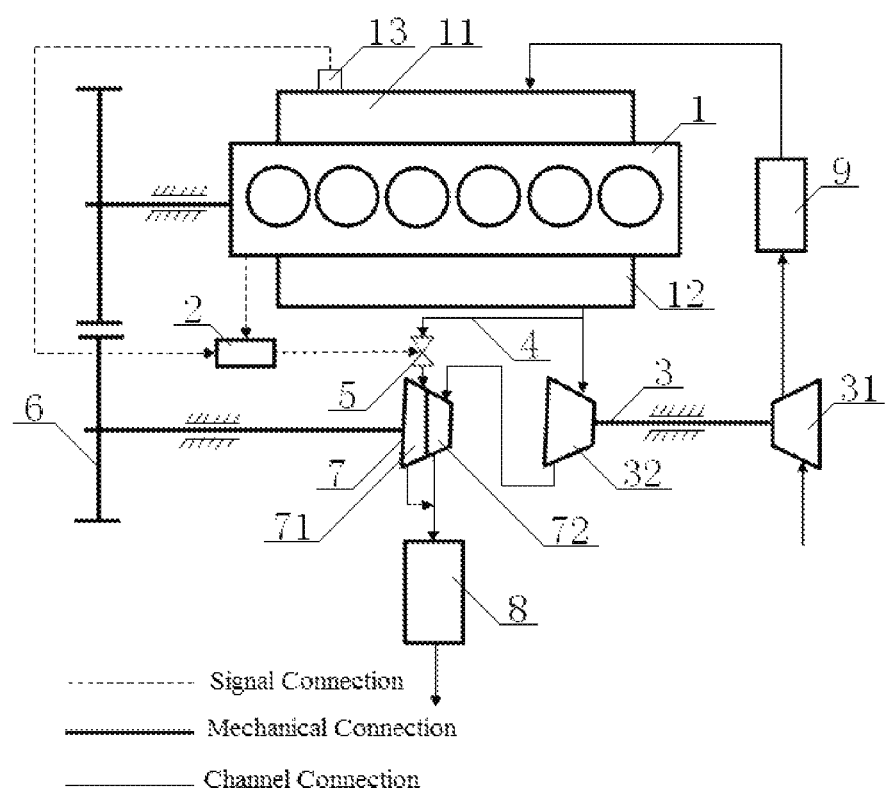

DOUBLE CHANNEL POWER TURBINE SYSTEM AND CONTROL METHOD THEREOF

TECHNICAL FIELD

The present invention relates to a power turbine system, and particularly to a double channel power turbine system and a control method thereof, which belong to the technical field of recycling of exhaust gas energy from internal combustion engines.

BACKGROUND ART

Currently, in the technical field of internal combustion engines, the energy used for power output of internal combustion engines only accounts for 35%-45% of the total amount of heat produced by the burning of fuel oil, while that spirited by exhaust gases occupies 30%-40%; therefore, recycling exhaust gas energy from internal combustion engines as much as possible can increase the output work of internal combustion engines, raise the thermal efficiency of internal combustion engines and improve fuel consumption, and is energy-saving and environment-friendly. The invention with the Chinese patent application No. CN104329148A and the application publication data of Feb. 4, 2015 discloses a two-stage power turbine system, including an internal combustion engine body, an intake manifold, an exhaust manifold, a turbocharger, a low-pressure power turbine, a high-pressure power turbine and a mechanical driving device, wherein the turbocharger includes a charging turbine and an air compressor; an inlet of the charging turbine is connected with the exhaust manifold, and an outlet of the charging turbine is connected with an inlet of the low-pressure power turbine; the high-pressure power turbine and the low-pressure power turbine are coaxially connected; an inlet of the high-pressure power turbine is connected with the exhaust manifold through a bypass pipeline, and after being connected parallelly with an outlet of the low-pressure power turbine, an outlet of the high-pressure power turbine is connected with the exhaust manifold. Although the invention can increase the recycling rate of exhaust gas energy from internal combustion engines and improve the output power of internal combustion engines, the invention still has the following defects: in the invention, the high-pressure power turbine and the low-pressure power turbine are coaxially connected, and when intake pressure falls short for a demand set by an internal combustion engine, the low-pressure power turbine is required to operate to drive the high-pressure power turbine to operate so that the exhaust gas energy from the internal combustion engine is transferred to a crankshaft of the internal combustion engine through the mechanical driving device, which causes the recycling rate of exhaust gas energy from the internal combustion engine to be relatively low.

SUMMARY OF THE INVENTION

The purpose of the present invention is to overcome the defect and problem of low recycling rate of exhaust gas energy from internal combustion engines existing in the prior art, and to provide a double channel power turbine system and a control method thereof with a high recycling rate of exhaust gas energy from internal combustion engines.

To achieve the purpose, the technical solution of the present invention is as follows: a double channel power turbine system, including an internal combustion engine body, a turbocharger and a mechanical driving device, wherein the turbocharger includes an air compressor and a turbocharger turbine that are in mechanical connection; an air outlet of the air compressor is in air channel connection with the internal combustion engine body after passing through an intake manifold, and an inlet of the turbocharger turbine is in channel connection with the internal combustion engine body after passing through an exhaust manifold; an outlet of the turbocharger turbine is in channel connection with a double channel power turbine, and the double channel power turbine is in mechanical connection with the internal combustion engine body through the mechanical driving device; the double channel power turbine includes a first power turbine channel and a second power turbine channel; an inlet of the first power turbine channel is in channel connection with the internal combustion engine body after passing through the exhaust manifold, and an inlet of the second power turbine channel is in channel connection with the internal combustion engine body after passing through the turbocharger turbine and the exhaust manifold successively; both an outlet of the first power turbine channel and an outlet of the second power turbine channel are in channel connection with an exhaust aftertreatment system.

The flow cross-sectional area of each of the first power turbine channel and the second power turbine channel is smaller than that of the turbocharger turbine. An air outlet of the air compressor is in air channel connection with the internal combustion engine body after passing through an intercooler and the intake manifold.

The inlet of the first power turbine channel is in channel connection with the internal combustion engine body after passing through a bypass valve, a bypass pipeline and the exhaust manifold successively.

The bypass valve is an electric control butterfly valve; the control end of the bypass valve is in signal connection with the internal combustion engine ECU; the internal combustion engine ECU is in signal connection with the internal combustion engine body, and the internal combustion engine ECU is in signal connection with a pressure sensor which is disposed on the intake manifold. The control method of the double channel power turbine system includes the following steps:

one part of exhaust gas in the internal combustion engine body passes through the exhaust manifold and the turbocharger turbine successively and is subsequently discharged into the second power turbine channel; the other part of the exhaust gas in the internal combustion engine body passes through the exhaust manifold and is subsequently discharged into the first power turbine channel; the exhaust gas in the first power turbine channel and the exhaust gas in the second power turbine channel are discharged by the exhaust aftertreatment system; when the exhaust gas discharged into the second power turbine channel flows through the turbocharger turbine, the turbocharger turbine drives the air compressor to operate; the air compressor sucks the air and compresses the air, the compressed air passes through the air outlet and the intake manifold of the air compressor successively and then enters the internal combustion engine body; when the exhaust gas in the first power turbine channel and the exhaust gas in the second power turbine channel pass through the exhaust aftertreatment system and then exhaust, the exhaust gas in the first power turbine channel and the exhaust gas in the second power turbine channel combine for working so as to drive the double channel power turbine system to operate; the double channel power turbine system converts the exhaust gas energy into mechanical energy and conveys the mechanical energy into the internal combustion engine body through a mechanical driving device so as to improve the output power of the internal combustion engine and recycle the waste heat energy of the internal combustion engine.

The air outlet of the air compressor is in air channel connection with the internal combustion engine body after passing through the intercooler and the intake manifold: the compressed air passes through the air outlet of the air compressor and the intake manifold successively and then enters the internal combustion engine body, indicating: the compressed air enters the intercooler after passing through the air outlet of the air compressor, the compressed air enters the intake manifold after being cooled by the intercooler and then enters the internal combustion engine body.

The inlet of the first power turbine channel is in channel connection with the internal combustion engine body after passing through the bypass valve, the bypass pipeline and the exhaust manifold successively; when the internal combustion engine is at a low speed and a low load: the bypass valve is closed; and at this time, the exhaust gas in the internal combustion engine body is discharged into the second power turbine channel after passing through the exhaust manifold and the turbocharger turbine successively to drive the double channel power turbine to operate;

when the internal combustion engine is at a high speed and a high load: the bypass valve is opened, and at this time, the other part of the exhaust gas in the internal combustion engine body is discharged into the first power turbine channel after passing through the exhaust manifold, indicating: the other part of the exhaust gas in the internal combustion engine body enters the first power turbine channel after passing through the exhaust manifold, the bypass pipeline and the bypass valve successively.

Compared with the prior art, the present invention has the following beneficial effects:
1. According to the double channel power turbine system and the control method thereof in the present invention, the double channel power turbine includes the first power turbine channel and the second power turbine channel, the inlet of the first power turbine channel is in channel connection with the internal combustion engine body after passing through the exhaust manifold, the inlet of the second power turbine channel is in channel connection with the internal combustion engine body after passing through the turbocharger turbine and the exhaust manifold successively, and both the outlet of the first power turbine channel and the outlet of the second power turbine channel are in channel connection with the exhaust aftertreatment system, due to the design, not only the structure is simple, but also in the working process, the exhaust gas discharged into the first power turbine channel and the exhaust gas discharged into the second power turbine channel are combined to work so as to drive the double channel power turbine to operate; the double channel power turbine converts the exhaust gas energy into the mechanical energy and conveys the mechanical energy into the internal combustion engine body through the mechanical driving device so as to increase the output power of the internal combustion engine and recycle the waste energy of the internal combustion engine. Therefore, according to the present invention, not only the recovery rate of the exhaust gas energy of the internal combustion engine is high, but also the structure is simple.
2. According to the double channel power turbine system and the control method thereof in the present invention, the flow cross-sectional area of the second power turbine channel is smaller than that of the turbocharger turbine, so that the rotation rate of the turbocharger turbine is increased, thereby increasing the rotation rate of the air compressor; the intake pressure is improved; the low-speed and low-load performance of the internal combustion engine is improved. Therefore, the present invention improves the low-load performance of the internal combustion engine. The air outlet is in air channel connection with the internal combustion engine body after passing through the bypass valve, the bypass pipeline and the exhaust manifold successively; the bypass valve is the electric control butterfly valve; the control end of the bypass valve is in signal connection with the internal combustion engine ECU; the internal combustion engine ECU is in signal connection with the internal combustion engine body; the internal combustion engine ECU is in signal connection with the pressure sensor which is disposed on the intake manifold; the internal combustion engine ECU enables the bypass valve to open to an optimal opening degree according to the requirements of the rotation rate and the load, so that the internal combustion engine can always obtain the optimal performance. Therefore, the present invention is high in performance.

BRIEF DESCRIPTION OF THE DRAWINGS

FIG. 1 is a structural schematic diagram of the present invention. In the FIGURE: internal combustion engine body 1, intake manifold 11, exhaust manifold 12, pressure sensor 13, internal combustion engine ECU 2, turbocharger 3, air compressor 31, turbocharger turbine 32, bypass pipeline 4, bypass valve 5, mechanical driving device 6, double channel power turbine 7, first power turbine channel 71, second power turbine channel 72, exhaust aftertreatment system 8, intercooler 9.

In the FIGURE, dash lines represent signal connection, thick full lines represent mechanical connection and fine full lines represent air channel connection.

DETAILED DESCRIPTION OF THE INVENTION

The present invention will be further illustrated below in detail in combination with the accompany drawings and detailed description. Referring to FIG. 1, a double channel power turbine system includes an internal combustion engine body 1, a turbocharger 3 and a mechanical driving device 6, wherein the turbocharger 3 includes an air compressor 31 and a turbocharger turbine 32 that are in mechanical connection, an air outlet of the air compressor 31 is in air channel connection with the internal combustion engine body 1 after passing through an intake manifold 11, and an inlet of the turbocharger turbine 32 is in an channel connection with the internal combustion engine body 1 after passing through an exhaust manifold 12, an outlet of the turbocharger turbine 32 is in channel connection with a double channel power turbine 7, and the double channel power turbine 7 is connected mechanically with the internal combustion engine body 1 through the mechanical driving device 6: the double channel power turbine 7 includes a first power turbine channel 71 and a second power turbine channel 72, an inlet of the first power turbine channel 71 is in channel connection with the internal combustion engine body 1 after passing through the exhaust manifold 12, and an inlet of the second power turbine channel 72 is in channel connection with the internal combustion engine body 1 after passing through the turbocharger turbine 32 and the exhaust manifold 12 successively, both the outlet of the first power turbine channel 71 and the outlet of the second power turbine channel 72 are in channel connection with an exhaust aftertreatment system 8.

The flow cross-sectional area of each of the first power turbine channel 71 and the second power turbine channel 72 is smaller than that of the turbocharger turbine 32. An air outlet of the air compressor is in air channel connection with the internal combustion engine body 1 after passing through an intercooler 9 and the intake manifold 11.

The inlet of the first power turbine channel 71 is in channel connection with the internal combustion engine body 1 after passing through a bypass valve 5, a bypass pipeline 4 and the exhaust manifold 12 successively.

The bypass valve 5 is an electric control butterfly valve, the control end of the bypass valve 5 is in signal connection with the internal combustion engine ECU 2, the internal combustion engine ECU 2 is in signal connection with the internal combustion engine body 1, and the internal combustion engine ECU 2 is in signal connection with the pressure sensor 13 which is disposed on the intake manifold 11.

A control method of the double channel power turbine system, including the following steps:
one part of exhaust gas in the internal combustion engine body 1 passes through the exhaust manifold 12 and the turbocharger turbine 32 successively and is subsequently discharged into the second power turbine channel 72, the other part of the exhaust gas in the internal combustion engine body 1 passes through the exhaust manifold 12 and is subsequently discharged into the first power turbine channel 71, the exhaust gas in the first power turbine channel 71 and the exhaust gas in the second power turbine channel 72 are exhausted by the exhaust aftertreatment system 8:
when the exhaust gas discharged into the second power turbine channel 72 flows through the turbocharger turbine 32: the turbocharger turbine 32 drives the air compressor 31 to operate, the air compressor 31 sucks the air and compresses the air, the compressed air passes through the air outlet and the intake manifold 11 of the air compressor successively and then enters the internal combustion engine body 1: when the exhaust gas in the first power turbine channel 71 and the exhaust gas in the second power turbine channel 72 pass through the exhaust aftertreatment system 8 and then exhaust: the exhaust gas in the first power turbine channel 71 and the exhaust gas in the second power turbine channel 72 combine for working so as to drive the double channel power turbine 7 to operate, the double channel power turbine 7 converts the exhaust gas energy into mechanical energy and conveys the mechanical energy into the internal combustion engine body 1 through the mechanical driving device 6 so as to improve the output power of the internal combustion engine and recycle the waste heat energy of the internal combustion engine.

The air outlet of the air compressor is in air channel connection with the internal combustion engine body 1 after passing through the intercooler 9 and the intake manifold 11: the compressed air enters the internal combustion engine body 1 after passing through the air outlet of the compressor 31 and the intake manifold 11, indicating: the compressed air enters the intercooler 9 after passing through the air outlet of the air compressor 31, the compressed air enters the intake manifold 11 after being cooled by the intercooler 9, and then enters the internal combustion engine body 1.

The inlet of the first power turbine channel 71 is in channel connection with the internal combustion engine body 1 after passing through a bypass valve 5, a bypass pipeline 4 and the exhaust manifold 12 successively:
when the internal combustion engine is at a low speed and a low load: the bypass valve 5 is closed, and at this time, the exhaust gas in the internal combustion engine body 1, after passing through the exhaust manifold 12 and the turbocharger turbine 32, is discharged into the second power turbine channel 72 to drive the double channel power turbine 7 to operate:
when the internal combustion engine is at a high speed and a high load: the bypass valve 5 is opened, and at this time, the other part of the exhaust gas in the internal combustion engine body 1, after passing through the exhaust manifold 12, is discharged into the first power turbine channel 71, indicating: the other part of the exhaust gas in the internal combustion engine body 1 enters the first power turbine channel 71 after passing through the exhaust manifold 12, the bypass pipeline 4 and the bypass valve 5. Principles of the present invention are described as follows:

1. The turbocharger turbine 32 and the double channel power turbine 7 are of substantially similar or identical size in a double channel power turbine system: the flow cross-sectional area of the first power turbine channel 71 and the flow cross-sectional area of the second power turbine channel 72 may be equal or may not be equal.

2. The air compressor 31: referring to FIG. 1, the air outlet of the air compressor 31 is connected with the internal combustion engine body 1 after passing through the intercooler 9 and the intake manifold 11 successively; during operation, when the waste gas discharged into the second power turbine channel 72 flows through the turbocharger turbine 32, the turbocharger turbine 32 drives the compressor 31 to operate, the air compressor 31 sucks the air and compresses the air, thereby increasing the power density of the internal combustion engine, the compressed air enters the intercooler 9 after passing through the air outlet of the air compressor 31, the compressed air enters the intake manifold 11 after being cooled by the intercooler 9, and then enters the internal combustion engine body 1 to take part in combustion.

3. The bypass valve 5: referring to FIG. 1, the bypass valve 5 is an electric control butterfly valve, the control end of the bypass valve 5 is in signal connection with the internal combustion engine ECU 2, the internal combustion engine ECU 2 is in signal connection with the internal combustion engine body 1, and the internal combustion engine ECU 2 is in signal connection with the pressure sensor 13 which is disposed on the intake manifold 11; during operation, the pressure sensor 13 on the intake manifold 11 transmits pressure signals together with a rotating speed and a load on the internal combustion engine body 1 to the internal combustion engine ECU 2, which are processed by the internal combustion engine ECU 2, and then the internal combustion engine ECU 2 transmits desired execution signals to an execution mechanism of the bypass valve 5 according to the size of the rotating speed and load of the internal combustion engine and the change of intake pressure; when the internal combustion engine is at a low speed and a low load, the bypass valve 5 is closed; when the internal combustion engine is at a high speed and a high load, the bypass valve 5 is opened, and the internal combustion engine ECU 2 enables the bypass valve 5 to open to an optimal opening degree according to the requirements of the rotation rate and the load, so that the internal combustion engine can always obtain the optimal performance.

Example 1

Referring to FIG. 1, the double channel power turbine system includes the internal combustion engine body 1, the turbocharger 3 and the mechanical driving device 6, wherein the turbocharger 3 includes the air compressor 31 and the turbocharger turbine 32 that are mechanically connected, the air outlet of the air compressor 31 is in air channel connection with the internal combustion engine body 1 after passing through the intake manifold 11, and the inlet of the turbocharger turbine 32 is in channel connection with the internal combustion engine body 1 after passing through the exhaust manifold 12; the outlet of the turbocharger turbine 32 is in channel connection with the double channel power turbine 7, and the double channel power turbine 7 is connected mechanically with the internal combustion engine body 1 through the mechanical driving device 6; the double channel power turbine 7 includes the first power turbine channel 71 and the second power turbine channel 72, the inlet of the first power turbine channel 71 is in channel connection with the internal combustion engine body 1 after passing through the exhaust manifold 12, and the inlet of the second power turbine channel 72 is in channel connection with the internal combustion engine body 1 after passing through the turbocharger turbine 32 and the exhaust manifold 12 successively; both the outlet of the first power turbine channel 71 and the outlet of the second power turbine channel 72 are in channel connection with the exhaust aftertreatment system 8.

According to the above approach, the control method of the double-channel power turbine system is provided, including the following steps:

one part of the exhaust gas in the internal combustion engine body 1 passes through the exhaust manifold 12 and the turbocharger turbine 32 successively and is subsequently discharged into the second power turbine channel 72; the other part of the exhaust gas in the internal combustion engine body 1 passes through the exhaust manifold 12 and is subsequently discharged into the first power turbine channel 71; the exhaust gas in the first power turbine channel 71 and the exhaust gas in the second power turbine channel 72 are exhausted by the exhaust aftertreatment system 8; when the exhaust gas discharged into the second power turbine channel 72 flows through the turbocharger turbine 32, the turbocharger turbine 32 drives the air compressor 31 to operate; the air compressor 31 sucks the air and compresses the air; the compressed air passes through the air outlet and the intake manifold 11 of the air compressor successively and then enters the internal combustion engine body 1: when the exhaust gas in the first power turbine channel 71 and the exhaust gas in the second power turbine channel 72 pass through the exhaust aftertreatment system 8 and are then discharged: the exhaust gas in the first power turbine channel 71 and the exhaust gas in the second power turbine channel 72 combine for working so as to drive the double channel power turbine 7 to operate, the double channel power turbine 7 converts the exhaust gas energy into the mechanical energy, and conveys the mechanical energy into the internal combustion engine body 1 through the mechanical driving device 6 so as to improve the output power of the internal combustion engine and recycle the waste heat energy of the internal combustion engine.

Example 2

The basic content is identical with Example 1, the difference resides in that: referring to FIG. 1, the flow cross-sectional area of each of the first power turbine channel 71 and the second power turbine channel 72 is smaller than that of the turbocharger turbine 32; the air outlet of the air compressor 31 is in air channel connection with the internal combustion engine body 1 after passing through the intercooler 9 and the intake manifold 11;

the compressed air enters the internal combustion engine body 1 after passing through the air outlet of the air compressor 31 and the intake manifold 11, indicating: the compressed air enters the intercooler 9 after passing through the air outlet of the air compressor 31, the compressed air enters the intake manifold 11 after being cooled by the intercooler 9, and then enters the internal combustion engine body 1.

Example 3

The basic content is identical with Example 1, the difference resides in that: referring to FIG. 1, the inlet of the first power turbine channel 71 is connected with the internal combustion engine body 1 after passing through the bypass valve 5, the bypass pipeline 4, and the exhaust manifold 12 successively; the bypass valve 5 is the electric control butterfly valve; the control end of the bypass valve 5 is in signal connection with the internal combustion engine ECU 2; the internal combustion engine ECU 2 is in signal connection with the internal combustion engine body 1, and the internal combustion engine ECU 2 is in signal connection with the pressure sensor 13 which is disposed on the intake manifold 11;

when the internal combustion engine is at a low speed and a low load: the bypass valve 5 is closed, and at this time, the exhaust gas in the internal combustion engine body 1, after passing through the exhaust manifold 12 and the turbocharger turbine 32, is discharged into the second power turbine channel 72 to drive the double channel power turbine 7 to operate; when the internal combustion engine is at a high speed and a high load: the bypass valve 5 is opened, and at this time, another part of exhaust gas in the internal combustion engine body 1, after passing through the exhaust manifold 12, is discharged into the first power turbine channel 71, indicating: the other part of the exhaust gas in the internal combustion engine body 1 enters the first 12 power turbine channel 71 after passing through the exhaust manifold 12, the bypass pipeline 4 and the bypass valve 5 successively.

The invention claimed is:
1. A double channel power turbine system, comprising:
an internal combustion engine (1);
a mechanical driving device (6); and
a turbocharger (3), the turbocharger (3) further including:
an air compressor (31) being connected to a turbocharger turbine (32) via a mechanical connection;
an air outlet of the air compressor (31) being in an air channel connection with the internal combustion engine (1) through an intake manifold (11);
an inlet of the turbocharger turbine (32) being in a first exhaust gas channel connection with the internal combustion engine (1) through an exhaust manifold (12);
an outlet of the turbocharger turbine (32) being in a second exhaust gas channel connection with a double channel power turbine (7);
wherein the double channel power turbine (7) is mechanically connected with the internal combustion engine (1) via the mechanical driving device (6); and further includes:
a first power turbine channel (71) having:
a flow cross-sectional area being smaller than a flow cross-sectional area of the turbocharger turbine (32); and an inlet of the first power turbine channel (71) being in a third exhaust gas channel connection with the internal combustion engine (1), receiving a first portion of exhaust gas generated in the internal combustion engine (1) and passing through the exhaust manifold (12);

wherein a first flow rate of the first portion of the exhaust gas entering in the first power turbine channel (71) is greater than a flow rate of the exhaust gas entering in the turbocharger turbine (32);

a second power turbine channel (72) having:
a flow cross-sectional area being smaller than a flow cross-sectional area of the turbocharger turbine (32); and
an inlet of the second power turbine channel (72) being in the second exhaust gas channel connection with the turbocharger turbine (32), receiving a second portion of the exhaust gas generated in the internal combustion engine (1) and passing through the exhaust manifold (12) successively;
wherein a second flow rate of the second portion of the exhaust gas entering in the second power turbine channel (72) is greater than a flow rate of the exhaust gas entering in the turbocharger turbine (32); and both of an outlet of the first power turbine channel (71) and an outlet of the second power turbine channel (72) being connected to an exhaust aftertreatment system (8);

wherein the first portion of the exhaust gas in the first power turbine channel (71) and the second portion of the exhaust gas in the second power turbine channel (72) is to operate the double channel power turbine to convert an exhaust gas energy into a mechanical energy, and to convey the mechanical energy being applied on the internal combustion engine (1) via the mechanical driving device (6); and wherein the first portion of the exhaust gas in the first power turbine channel (71) in combination with the second portion of the exhaust gas in the second power turbine channel (72) is discharged through the exhaust aftertreatment (8).

2. The double channel power turbine system of claim 1, further comprising an intercooler positioned in the air channel connection between the air outlet of the air compressor (31) and the intake manifold (11) of the internal combustion engine (1) for cooling compressed air before being delivered into the internal combustion engine (1).

3. The double channel power turbine system of claim 1, further comprising:
a bypass pipeline (4) diverting the exhaust gas from the first exhaust gas channel connection with the internal combustion engine (1) through an exhaust manifold (12); and
a bypass valve (5) positioned in the bypass pipeline to control the exhaust gas flowing out of the internal combustion engine (1) through an exhaust manifold (12) to the inlet of the first power turbine channel (71);
wherein the bypass valve (5) is an electric control butterfly valve being controlled by an internal combustion engine ECU (2).

4. The double channel power turbine system of claim 3, further comprising:
at least one sensor for detecting operating conditions of the internal combustion engine (1) and being connected to the internal combustion engine ECU (2);
wherein the at least one sensor is a pressure sensor (13) disposed on the intake manifold (11);
wherein
when the internal combustion engine is at a low speed and a low load, the pressure sensor (13) sends a low speed-low load signal to the ECU (2) which then sends a signal to close the bypass valve (5), and simultaneously the exhaust gas of the internal combustion engine (1) is discharged into the second power turbine channel (72) after passing through the exhaust manifold (12) and the turbocharger turbine (32) to operate the double channel power turbine (7);
when the internal combustion engine is at a high speed and a high load, the pressure sensor (13) sends a high speed-highload signal to the ECU (2) which then sends a signal to open the bypass valve (5); and simultaneously the first portion of the exhaust gas of the internal combustion engine (1) passing through the exhaust manifold (12) is discharged into the first power turbine channel (71) via the bypass pipeline (4).

* * * * *